Dec. 27, 1949  A. M. MARKS  2,492,809
UNITARY MULTIPLY POLARIZER
Original Filed Nov. 16, 1938
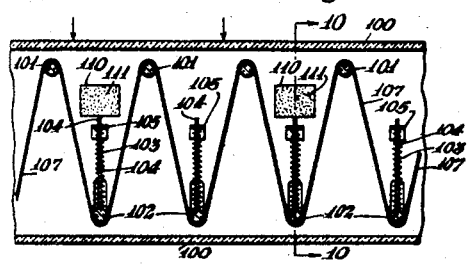
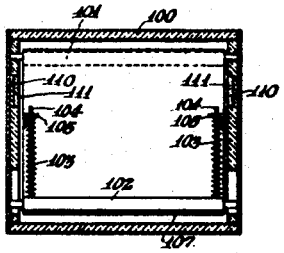
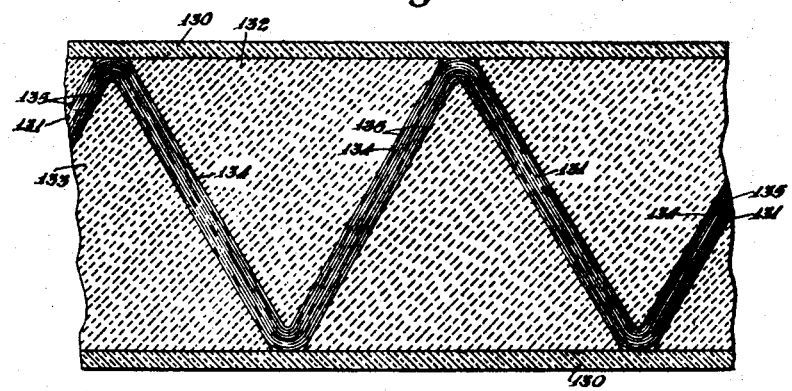
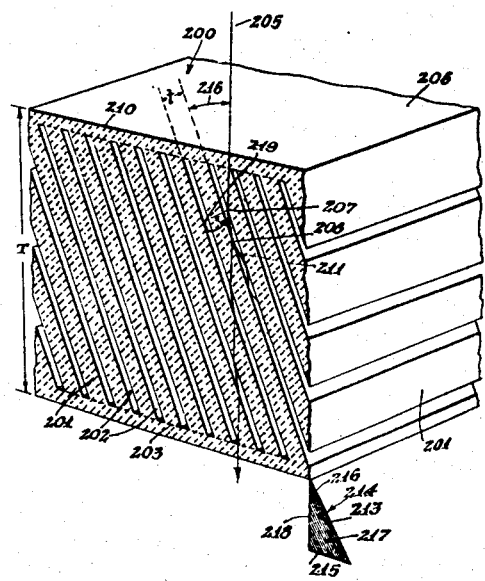
ALVIN M. MARKS
INVENTOR
BY Pineles & Greene
ATTORNEYS Patented Dec. 27, 1949

2,492,809

UNITED STATES PATENT OFFICE 2,492,809

UNITARY MULTIPLY POLARIZER

Alvin M. Marks, Flushing, N. Y.

Original application November 16, 1938, Serial No. 240,608. Divided and this application June 15, 1946, Serial No. 676,918

7 Claims. (Cl. 88—65)

My invention relates to a sheet polarizer and to various methods of producing the same, and to various modified forms of such sheet polarizers.

This invention relates to a polarizing medium comprising a plurality of layers of united, thin plastic sheets.

The thin plastic sheets which comprise the polarizer of my invention are preferably on the order of .0015 inch or less although they may run as thick as .004 inch. I prefer to use from 15 to 30 of these plastic sheets of the thickness above referred to and to closely contact and suitably join these sheets together to get such permanent interfacial contact for proper polarizing results.

I may engage the respective layers of plastic film together by stapling or other engaging means, such as sewing, the engaging means being spaced throughout the area of the respective plates at intervals, such intervals being sufficiently separated so as not to materially interfere with light transmission.

As a more desirable method I effect the bonding of the plates by spotting the plates with a thermoplastic or plasticizer at spaced intervals. In this connection if the plasticizer or thermoplastic spotting were exactly superimposed, they would provide light paths wherein light rays could travel through the bonded layers without being polarized, thus reducing the overall efficiency of the unit. Therefore, I have devised a structure wherein the aforesaid spotted areas are staggered so that every light ray must traverse sufficient layers so that reflections may occur to produce the polarized effects.

In lieu of employing separate plastic sheets separated by minute air layers, I have also found that alternate layers of materials having relatively high and relatively low indexes of refraction may be bonded together to form a polarizing unit. Thus, I may, if desired, composite such materials with their entire surfaces joined, since the polarizing effects are obtained here not by the spacing of the adjacent plastic sheets as in my above described structure, but by the differences in the indexes of refraction of the respective alternate layers. That is, the low index layers act in a manner similar to the air spaces in the structure described above. Illustrative of the materials employed in this structure are cellulose acetate sheeting bonded by hot press to sheets of cast transparent resins, or any suitable transparent plastic material with an index of refraction on the order of about 1.7 or more (cellulose acetate sheeting has an index of 1.49). Obviously, there is a wide range of transparent materials which may be employed in the structure, the only requisite being that the respective adjacent layers have a difference in index of refraction of .2 or more, preferably this difference being as large as possible. The change in index must be sharp, hence any type of bonding wherein a gradual index change results must be avoided. Illustrative is the use of too much plasticizer in the bond.

In order to maintain the plastic sheets in desired predetermined position, it is necessary to give them support. Glass sheets externally placed with respect to the composite sheets may be attached to the plastic sheets to support them, or I may employ externally of these combined plastic sheets one or more supporting members comprising, for example, a radially extending strip structure which acts to hold the composite sheets against sagging, or I may employ a supporting screen on the bottom or on the top or both top and bottom of the composite sheets. The screens should be of such construction that they present maximum support and minimum obstruction. When screens are used both on top and bottom, preferably I join the top and bottom screens with joining members such as staples to obtain a permanent rigid engagement between the two and hence form a secure unit. By the term "screen" I mean not only a wire mesh, but I intend to apply this term broadly to any supporting structure that offers surface support.

I may employ a cut out sheet for effecting the separation of the respective composite plastic sheets or layers. Such a cut away preformed sheet affords a certain stiffness or support and when a number of such cut away preformed sheets are employed to join the different layers, the stiffness of these combined preformed cut away sheets may afford sufficient support without external means.

In the event that it be desired to utilize said polarizing screen for polarizing rays directly normal to the plane of the polarizer, the wire mesh support may be bent back and forth to a zig-zag corrugated shape so that the composite polarizing sheets will be held by the support at the proper angle to the impinging beam, i. e., about thirty-three degrees.

Also for use in cases where the plastic multilayer polarizing means is to be located in a plane substantially normal to the light beam I have further devised a modified novel polarizer which comprises a rack consisting of substantially parallel rods spaced in progressively staggered relation and acting as supporting members over which the composite plastic polarizing sheet of my invention is wound in the manner shown in Figure 1. The polarized unit so formed receives light in the direction indicated by the arrows on the drawing referred to, the light travelling in a direction normal to the plane of the supporting members. The polarizing composite sheeting is positioned at such an angle that light travelling therethrough is polarized.

The rods are preferably opaque, for if they were transparent they would allow light to pass through them and the desired polarizing effect would be diminished. It is noted that in the structure I have set forth, the spacing means are individually maintained under pressure to provide a constant tension in each of the respective loops of wound composite plastic film so that throughout the life of the unit there is a sufficient even tension to prevent buckling of the film which may be due to aging or temperature effects. The constant tension induced in the composite layers of the plastic also preserves permanently the close physical relation and substantially parallel alignment between the respective layers of the structure which is of paramount importance in this device. The tension, however, should not be so great as to produce objectionable strains within the plastic such as would tend to produce elliptically polarized light.

In addition to these desirable factors, the tensioning of the sheets decidedly increases the light transmission property of the sheets over that which would be normally effected with the sheets under no tension. When the sheets are not under tension the buckling that occurs will greatly lower the effective light transmission.

This polarizing structure may be incorporated in transparent building blocks and, more specifically, I may employ an external glass casing within which is positioned this polarizing structure. As an alternative to the particular rack structure carrying composite plastic film, I may utilize any of the well known polarizing structures within the transparent casing.

In general, I propose to form structural units comprising at least an external and internal surface of transparent material, such as glass, and totally encased within this building unit a polarizing means positioned at a proper polarizing angle, which may be the plastic polarizing means described herein or the polarizing means set forth in my Patent No. 2,104,949 or any other well known polarizing means.

In the drawings,

Figure 1 is a cross section of a polarizing unit of my invention in which I provide a continuous composite plastic polarizing film wound about racks in a predetermined angular relation to produce polarization of light passing through the unit.

Figure 2 is a cross section taken along the line 10—10 of Figure 1.

Figure 3 is a cross section of a polarizing unit adapted to polarize light directed substantially normal to the surface thereof.

Figure 4 is a cut-away perspective showing a modified form of polarizing means of my invention comprising an assembly of joined plastic strips properly positioned to polarize light directed normally to the surface thereof.

In Figure 1 I show a polarizing unit comprising an external transparent casing 100 in which are positioned fixed rods 101 and movable rods 102 which movable rods are held under downwardly exerted pressure by the springs 103. Movable rods 102 are mounted on shafts 104 which are slidably mounted in brackets 105. Multiple layers of plastic material 107 comprising a polarizing means of my invention is wound over the fixed rods 101 and movable rods 102 as shown. The downward compression exerted by the spring 103 on the movable rods 102 maintains the composite polarizing film 107 in a taut condition and positions it in predetermined angles with respect to the transparent casing 100. The light to be polarized enters through either side of the casing 100 in accordance with the utility of the unit and passes through the composite polarizing film 107 striking the composite film at such a predetermined angle that the light is polarized during its transmission therethrough. It is to be noted that the rods 101 and 102 are opaque inasmuch as if these rods were transparent the light travelling therethrough would not be polarized because it would not impinge the polarizing composite sheet 107 at the proper angle. Therefore, all light which travels through the unit is polarized by the polarizing film 107 in its optimum polarizing angular position.

The movable rods 102, forced downward by suitable depressing devices, are of particular utility inasmuch as the polarizing means 107 comprises a plurality of layers of plastic material. There normally would be a certain tendency for this so extended layer to stretch and therefore sag. This would impair its polarizing property inasmuch as the composite would then be improperly angularly positioned with respect to the light to be polarized. Further, the adhesive or plasticizer that joins the respective layers of the composite film might in time lose its effectiveness and this would further the tendency of the respective component layers of the polarizing sheet to separate. This is properly counteracted, however, by the constant pressure exerted by the movable rods 102 which maintain the respective layers in close relationship and which acts to correct any tendency to separate. Although conceivably I could exert this pressure at the respective ends of the polarizing film 107, I have obtained measurably superior results by employing the movable rods under pressure through the device as shown, since in this way I have obtained a uniform and constant pressure on all points of the plastic film with no impairment of this pressure by the sectional contact of the polarizing film with the rods 107 such as would be experienced if the pressure were applied at the ends of the film instead of at intermediate points thereof as shown here.

Referring now more specifically to Figure 3, I show a polarizing unit adapted to polarize light directed substantially normally incident thereon, which polarizing unit is adapted to be employed for polarizing sunlight or artificial light, as, for example, in skylights or building constructions generally.

The polarizing action is effected by the composite film 131 which comprises a multiplicity of thin plastic films 134 joined together by adhesion inducing means such as solvent or cement or preformed plastic 135. To properly position this composite polarizing sheet, I place it between blocks 132 and 133 which are approximately triangular in section and which maintain the composite film permanently at substantially a thirty-three degree angle with respect to the normal so that light passing therethrough from the surface 130 of the unit is polarized. The entire mass forms a solid unit by virtue of the joints between the surface 130 and the blocks 132 and the polarizer 131. All elements being transparent, the entire unit is transparent.

For absorbing the reflected light from the uppermost surface of the composite polarized sheet, I may provide dark absorbent areas as, for example, in the form of a dark sheet which bisects the triangular block 132 and extends from midway between the base of that block to midway between the base of the triangle. This sheet is optional and may be used for increased efficiency.

Referring now more specifically to Figure 4, I show a polarizing unit 200 which comprises a multiplicity of plastic strips 201 separated by spaces 202. The strips are combined by applying a solvent to the edges thereof as at 203, which solvent effectively dissolves the surface of the strip at that point and causes an amalgamation and solid joining up of the respective strips. In lieu of a solvent, I may employ a thermo-adhesive or adhesive compounds generally but I particularly prefer to employ an adhesive means containing a solvent inasmuch as such solvent will have an effective sealing action on the edges of the composite to permanently seal the assembled strips against the entry of deleterious influences. It will be noted that the strips 201 are positioned with respect to each other in their composite form at a predetermined angle. This angle is such that the light beam 205 may be substantially normal to the plane 206 of the polarizing unit 200.

A feature of this device is that the strips 201 may be placed and permanently held in position at a larger angle with respect to the ray 205, because after emerging from the first strip, the ray is refracted at point 207 so that it assumes a greater angle of incidence upon striking the succeeding strip 208.

In the fabrication of this article, it is desirable to employ as few strips as possible per unit area to provide effective polarization and the method I employ here is a device to minimize the number of these strips by increasing the angle which these strips may make with the ray 205 without deviating from the proper critical value for best polarization of the beam directed normal to the surface 206. That is, the strips are laid out flatter in their assembly and hence extend farther along the extent of the unit which is in the direction along the edge 210.

Another feature of this device is that the rays which during polarization are reflected as from 208 (ray 211), are reflected internally between the respective sheets until substantially absorbed, as shown.

The most important feature of this particular polarizing device is that the strips of preferably plastic material are so arranged angularly with respect to each other and spaced to provide a certain spacing between the respective sheets so that light such as 205 striking the unit substantially normal to its surface 206 passes through preferably 25 separate plastic sheets and the spaces therebetween so that optimum polarization is effected, these sheets being joined at their outermost edges into a continuous surface which thereby forms the entire device into a permanent sealed substantially unitary construction. Although I have set forth that the optimum number of sheets is 25 through which the light must pass, I have found that the effective range is substantially from 15 to 30.

As further illustrative of the construction of this device, refer to the reduced triangle 214 which is diagrammatically attached to unit 200. The line 215 which is the base of the triangle is parallel to the edge 210 and intercepts 25 sheets which are included between the hypotenuse 213 of the triangle and the base 215. Fine lines 217 represent the reduced strips 201. The angle 216 between the plane of the strips and the normal incident ray 205 bears the following relation to the thickness of the strips and the total thickness of the unit:

$$T = \frac{nt}{\sin \angle 216} \quad \text{Equation A}$$

where T is the total thickness of the unit, n is the number of sheets selected, which may be equal to 25, and t is the thickness of the sheets plus the air space adjacent thereto.

As a further definition for the best construction of this device, $\angle 216$ is defined as follows:

$$\angle 216 = \cos^{-1}\left(\frac{\sin \angle 219}{\mu}\right) \quad \text{Equation B}$$

where $\mu$ equals the index of refraction and $\angle 219$ is the critical angle of incidence of the light ray striking the second plastic strip and subsequent plastic strips, this angle being the optimum polarizing angle for the light.

It is further characterized by the following:

$$\angle 219 = \tan^{-1} \mu \quad \text{Equation C}$$

where $\mu$ is equal to the index of refraction of the plastic material which is uniform throughout.

Combining B and C I obtain an equation which gives a definite angle 216 for any particular value of the index of refraction of the material used, thus:

$$\angle 216 = \cos^{-1}\frac{\sin (\tan^{-1}\mu)}{\mu} \quad \text{Equation D}$$

Thus, I provide a simple polarizing device comprising combined and slightly spaced preferably plastic strips permanently positioned at the optimum polarizing angle with certain definite relationships as above set forth with regard to the thickness of the unit, which is determined by the angular position and the number of strips, namely about 25, which the light 205 is to traverse for optimum polarization thereof. For the best operability of this device, the spaces 202 between the respective plastic sheets 201 should be small relative to the thickness of the plastic sheets. In other words, if the plastic sheets are in the order of .003 the spaces should be in the order of .0003 of an inch or less. The polarization is effected, of course, in this unit as in the various modifications outlined above, by the respective abrupt changes in index of refraction in the plastic strips and the air spaces therebetween. Although I term the spaces between the plastic strips air spaces, I include any medium that represents an abruptly different index of refraction of sufficient magnitude, namely, .2 or more, and these spaces may be of any gas or liquid or solid material having these requirements.

This unit is characterized from a structural standpoint by the fact that it polarizes effectively light directed normally to its surface and also is of such simple construction as to be readily available for many purposes.

This application is a division of my application Serial No. 240,608, filed November 16, 1938, now Patent 2,402,176, June 18, 1946.

Although certain specific embodiments of this invention have been shown and described, it will be understood that many modifications thereof are possible. This invention, therefore, is not to be restricted except isofar as is necessitated by the prior art and by the spirit of the appended claims.

I claim:

1. In a polarizing unit having two parallel unbroken outer surfaces, a plurality of layers of thin solid transparent material secured together by transparent adhesive, at a multiplicity of narrow areas, so as to leave flat air spaces around such secured areas, the said secured areas being spaced throughout the entire area of said layers and the secured areas of any two adjacent pair of layers being staggered with respect to the secured areas of the next adjoining pairs of layers.

2. In a polarizing unit having two parallel unbroken outer surfaces, a plurality of layers of thin solid transparent material secured together by transparent thermoplastic adhesive, at a multiplicity of spaced areas, so as to leave flat air spaces around such secured areas, the said secured areas being spaced throughout the entire area of said layers and the secured areas of any two adjacent pair of layers being staggered with respect to the secured areas of the next adjoining pairs of layers.

3. In a polarizing unit having two parallel unbroken outer surfaces, a plurality of layers of thin solid transparent material secured together at a multiplicity of spaced areas, so as to leave flat air spaces alongside such secured areas, the secured areas of adjacent pairs of layers being staggered with respect to the secured areas of other adjacent pairs of layers, such layers being positioned between the said outer surfaces and making an angle of about 57° with said outer surfaces of said unit.

4. In a polarizing unit having two parallel unbroken outer surfaces, a plurality of layers of thin solid transparent material secured together by transparent plasticizer adhesive at a multiplicity of small spaced areas to leave flat air spaces adjacent such secured areas, the said secured areas being spaced throughout the entire area of said layers and the secured areas of any two adjacent pair of layers being staggered with respect to the secured areas of the next adjoining pairs of layers, means for supporting said layers of plastic material at an angle of 57° to the said surfaces of said unit comprising a wire mesh screen.

5. In a polarizing unit having two parallel unbroken outer surfaces, a plurality of layers of thin solid transparent material secured together by transparent thermoplastic adhesive at a multiplicity of small spaced areas to leave flat air spaces adjacent such secured areas, the said secured areas being spaced throughout the entire area of said layers and the secured areas of any two adjacent pair of layers being staggered with respect to the secured areas of the next adjoining pairs of layers, means for supporting said layers of plastic material at an angle of 57° to the said surfaces of said unit comprising a plurality of rods under tension to maintain the layers flat.

6. In a polarizing unit having two parallel unbroken outer surfaces, a plurality of layers of thin solid transparent material secured together by transparent plasticizer adhesive at a multiplicity of small spaced areas to leave flat air spaces adajcent such secured areas, the said secured areas being spaced throughout the entire area of said layers and the secured areas of any two adjacent pair of layers being staggered with respect to the secured areas of the next adjoining pairs of layers, said secured layers of transparent material being zig-zagged within the surfaces and supported at such an angle to provide maximum polarization to light directed normal to the said surfaces.

7. In a polarizing unit having two parallel unbroken outer surfaces, a plurality of layers of thin solid transparent plastic material, the adjacent parts of layers being secured together by a thin network of transparent adhesive material so as to form a number of flat air spaces between each pair of said layers corresponding to the open spaces in the network, the adhered areas of any pair of layers being staggered with respect to the adhered areas of the adjacent pairs of layers.

ALVIN M. MARKS.

REFERENCES CITED

The following references are of record in the file of this patent:

UNITED STATES PATENTS

| Number | Name | Date |
| --- | --- | --- |
| 1,222,049 | Tillyer | Apr. 10, 1917 |
| 1,358,413 | Brodsky | Nov. 9, 1920 |

FOREIGN PATENTS

| Number | Country | Date |
| --- | --- | --- |
| 696,673 | France | Oct. 20, 1930 |
| 390,611 | Great Britain | Apr. 13, 1933 |
| 460,666 | Great Britain | Jan. 28, 1937 |

OTHER REFERENCES

Brewster's Text, "A Treatise on Optics," pages 227–229 (1853).

Jenkins & White Text, "Fundamentals of Physical Optics," pages 316, 317, 1937.